P. N. FOWLER.
Ditching-Machine.
No. 196,346. Patented Oct. 23, 1877.
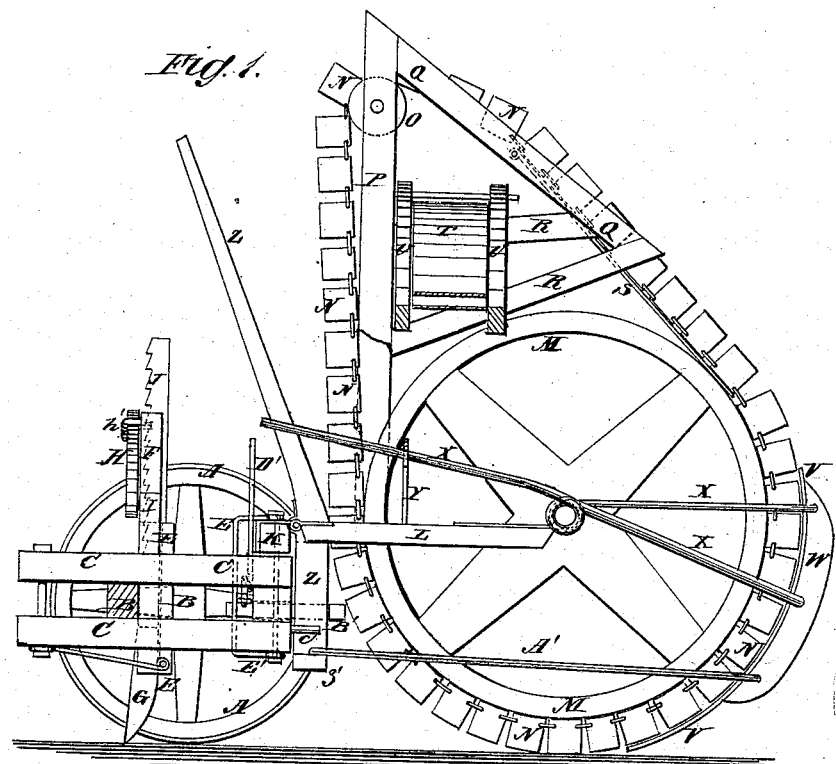
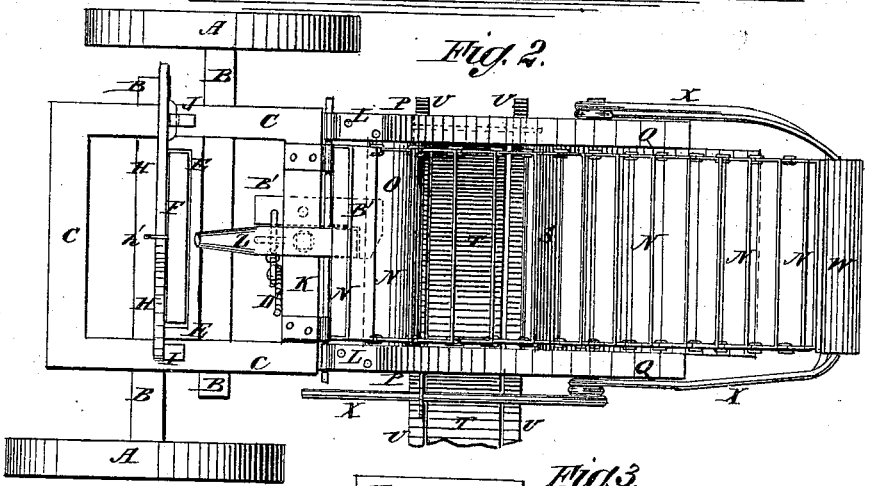
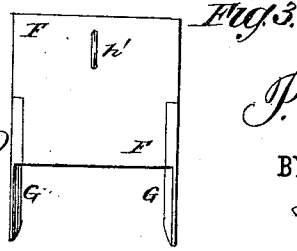
WITNESSES:
Francis McArdle
J. H. Scarborough
INVENTOR:
P. N. Fowler
BY Munn & Co
ATTORNEYS.

UNITED STATES PATENT OFFICE.

PETER N. FOWLER, OF SMITH'S MILLS, KENTUCKY.

IMPROVEMENT IN DITCHING-MACHINES.

Specification forming part of Letters Patent No. 196,346, dated October 23, 1877; application filed July 30, 1877.

*To all whom it may concern:*

Be it known that I, PETER N. FOWLER, of Smith's Mills, in the county of Henderson and the State of Kentucky, have invented a new and useful Improvement in Ditching-Machines, of which the following is a specification:

Figure 1 is a side view of my improved machine, parts being broken away to show the construction. Fig. 2 is a top view of the same. Fig. 3 is a detail front view of the cutter-holder and cutters.

Similar letters of reference indicate corresponding parts.

The object of this invention is to furnish an improved machine for opening ditches, which shall be simple in construction, convenient in use, and effective in operation, removing the soil and depositing it at the side of the ditch.

The invention will first be described in connection with the drawing, and then pointed out in the claims.

A are the wheels, which revolve upon the journals of the axles B, which are placed parallel with each other, and are secured to and between two parallel frames, C, by bolts or other suitable fastening that will allow the axles to be conveniently adjusted to arrange the wheels A closer together or farther apart, as may be required.

The axles B may also be connected together by bands or clamps. To the double frame C, between the axles B, is attached a plate, E, having forwardly-projecting flanges attached to or formed upon its side edges, to adapt it to serve as a way and support for the cutter-holder F, which slides up and down upon its forward side between the said flanges. The holder F is made in the form of a plate, and has long notches formed in the lower parts of its side edges, in which are secured the shanks of the cutters G.

The cutters G are designed to cut off any roots that may cross the ditch and would interfere with the operation of the buckets or soil-lifting knives, and may be raised to pass obstructions that they cannot cut, and lowered as the ditch increases in depth, by means of the lever H, one end of which is pivoted to a short standard, I, attached to a side bar of the upper frame C. The lever H passes through a keeper, h', attached to the cutter-holder F, and its free end moves up and down along the notched side of the standard J, attached to the side bar of the frame C, so that it may be held in any position into which it may be adjusted. To the center of the rear cross-bar of the double frame C is pivoted the bolster K, to the rear upper corners of which are hinged the forward ends of two bars, L. To the rear ends of the bars L are attached bearings, in which revolve the journals of the wheel M. The wheel M is made large, and with a wide, smooth-faced rim. N is an endless chain of buckets or soil-lifting knives, which knives or buckets are formed of sharp-edged steel bars or plates, of suitable length and width, and the end parts of which are bent forward at right angles, and which are connected together by links or rings. The endless chain N of buckets passes around the wheel M, and around a roller, O, pivoted to and between the upper parts of two upright bars, P, the lower ends of which are attached to the bars L, near their forward ends. To the rear sides of the upper ends of the upright bars P are attached the upper ends of the bars Q, which incline downward and extend nearly to the top of the wheel M. The lower ends of the inclined bars Q are held in position by the bars or braces R, the rear ends of which are attached to the lower ends of the inclined bars Q, and their forward ends are attached to the upright bars P. To the middle parts of the bars Q is pivoted the upper end of a plate, S, the lower end of which rests upon the face of the wheel M, at the point where the buckets N begin to rise from said face, so as to act as a scraper to separate the soil from the said wheel and cause it to pass up the said plate S with the buckets. At the upper end of the plate S the soil drops from the buckets N, upon the endless apron T, which passes around rollers pivoted to the frame U.

The carrier-frame rests upon the inclined brace-bars R, is attached to said brace-bars R or to the upright bars P, and is set at such an inclination that the soil will carry the endless apron T forward by its own weight, and will be discharged at the side of the ditch.

As the buckets N begin to rise at the lower side of the wheel M, the soil within said buckets will be separated from the soil beneath it by the edge of the plate V, which is attached to the block or shoe W, and extends up on the rear side of the wheel M to a point a little above the center of the said wheel, so as to act as a guard to prevent the soil from falling out of the buckets N while they are passing up.

The plate V and shoe W are held in place by rods X, the outer ends of which are attached to the shoe W, and their inner ends are connected with the journals of the wheel M, or the ends of the bars L.

One of the rods X is extended forward to serve as a lever for raising the plate V and the shoe W, when required.

The lever X is secured in place to hold the plate V and shoe W suspended, by being caught upon the catch-rod Y, attached to the bar L.

To the bolster K is pivoted a lever, Z, to the lower end of which is attached a cross-head, $z'$. To the ends of the cross-head $z'$ are attached the ends of two rods, A', the other ends of which are attached to the lower part of the shoe W, so that by operating the lever Z the plate V may be drawn down into working position. The lever Z is locked in position for holding the plate V down to its work by the hook B', pivoted in a slot in the rear bar of the frames C.

$c'$ is a stop pin or block attached to the rear cross-bar of the frames C, to prevent the lever Z from being pushed to one side by the action of the hook B'. The hook B' is thrown into and out of gear with the lever Z by the lever D', which is pivoted to the inner side of the rear cross-bar of the frames C, and the lower end of which is connected with the inner end of the hook B'. The bolster K may be placed either above or below the rear cross-bar of the frames C, and is kept in place upon said cross-bar by the keeper E', the ends of which are connected with the ends of the bolt that pivots the said bolster.

Having thus described my invention, I claim as new and desire to secure by Letters Patent—

1. The combination of the flanged plate E, the sliding cutter-holder F, the cutters G, the lever H, and the catch-bar J with the double frame C and the two axles B, substantially as herein shown and described.

2. The combination of the pivoted bolster K, the hinged frame-work L P Q R, the wheel M, and the endless chain N of buckets or soil-lifting knives with the double frame C and the axles and wheels B A, substantially as herein shown and described.

3. The combination of the plate S with the endless chain N of buckets, the wheel M, and the frame-work L P Q R, substantially as herein shown and described.

4. The combination of the plate V, the shoe W, and the rods X with the endless chain N of buckets, the wheel M, and the frame-work L P Q R, substantially as herein shown and described.

5. The combination of the lever X and catch-bar Y with the shoe and plate W V, the endless chain N of buckets, the wheel M, and the frame-work L P Q R, substantially as herein shown and described.

6. The combination of the cross-head lever Z and the rods A' with the pivoted bolster K, the plate and shoe V W, the endless chain N of buckets, and the wheel M, substantially as herein shown and described.

7. The combination of the hook B', the lever D', and the stop $c'$ with the double frame C and the cross-head lever Z, substantially as herein shown and described.

PETER NATHANIEL FOWLER.

Witnesses:
S. LATTA,
CHARLES R. FOWLER.